United States Patent [19]

Swaroop et al.

[11] Patent Number: 5,234,876
[45] Date of Patent: Aug. 10, 1993

[54] THERMALLY STABLE CHROMIUM-EXCHANGED ZEOLITES AND METHOD OF MAKING SAME

[75] Inventors: Srinivas H. Swaroop; Raja R. Wusirika, both of Painted Post, N.Y.

[73] Assignee: Corning Incorporated, Corning, N.Y.

[21] Appl. No.: 963,602

[22] Filed: Oct. 20, 1992

[51] Int. Cl.$^5$ .......................... B01J 29/14; B01J 37/30
[52] U.S. Cl. .......................................... 502/79; 502/60
[58] Field of Search ...................................... 502/60, 79

[56] References Cited

U.S. PATENT DOCUMENTS

| | | | |
|---|---|---|---|
| 3,236,910 | 2/1966 | Bukata et al. | 502/79 |
| 3,783,123 | 1/1974 | Young | 208/111 |
| 3,783,125 | 1/1974 | Ondrey et al. | 502/60 |
| 3,885,977 | 5/1975 | Lachman et al. | 106/62 |
| 3,929,620 | 12/1975 | Parthasarathy et al. | 208/111 |
| 3,929,621 | 12/1975 | Lussier et al. | 502/79 |
| 4,127,691 | 11/1978 | Frost | 428/116 |
| 4,151,121 | 4/1979 | Gladrow | 208/120 |
| 4,164,465 | 8/1979 | Gladrow | 208/120 |
| 4,348,272 | 9/1982 | Hosheng Tu | 208/111 |
| 4,429,053 | 1/1984 | Ward | 502/65 |
| 4,434,047 | 2/1984 | Hensley et al. | 208/111 |
| 4,448,998 | 5/1984 | King | 502/60 |
| 4,758,272 | 7/1988 | Pierotti et al. | 75/246 |
| 4,845,063 | 7/1989 | Chu | 502/60 |
| 4,992,233 | 2/1991 | Swaroop et al. | 419/2 |

FOREIGN PATENT DOCUMENTS

| | | |
|---|---|---|
| 0348001 | 6/1989 | European Pat. Off. . |
| 0462598A2 | 6/1991 | European Pat. Off. . |
| 148728 | 8/1984 | Japan ...... 502/60 |

*Primary Examiner*—Carl F. Dees
*Attorney, Agent, or Firm*—L. Rita Quatrini

[57] ABSTRACT

Thermally stable Cr-zeolites and Cu-Cr-zeolites, and methods of making same are disclosed. The zeolites have a $SiO_2$ to $Al_2O_3$ mole ratio of about 3 to about 200, and an initial alkali content of less than about about 0.5% by weight based on the alkali oxide. Chromium ions are exchanged into the zeolite to produce Cr-zeolite in which the Cr level is greater than about 0.5% by weight. Copper and chromium ions are provided exchanged on a zeolite to produce Cu-Cr-zeolite. The respective Cr-exchanged zeolites are heat-treated to produce the thermally stable zeolites wherein the BET surface area upon exposure to temperatures of up to about 1000° C. is at least about 50% of the BET surface area of the respective thermally stable zeolites at about room temperature, prior to the exposure to temperatures of up to about 1000° C.

9 Claims, 1 Drawing Sheet

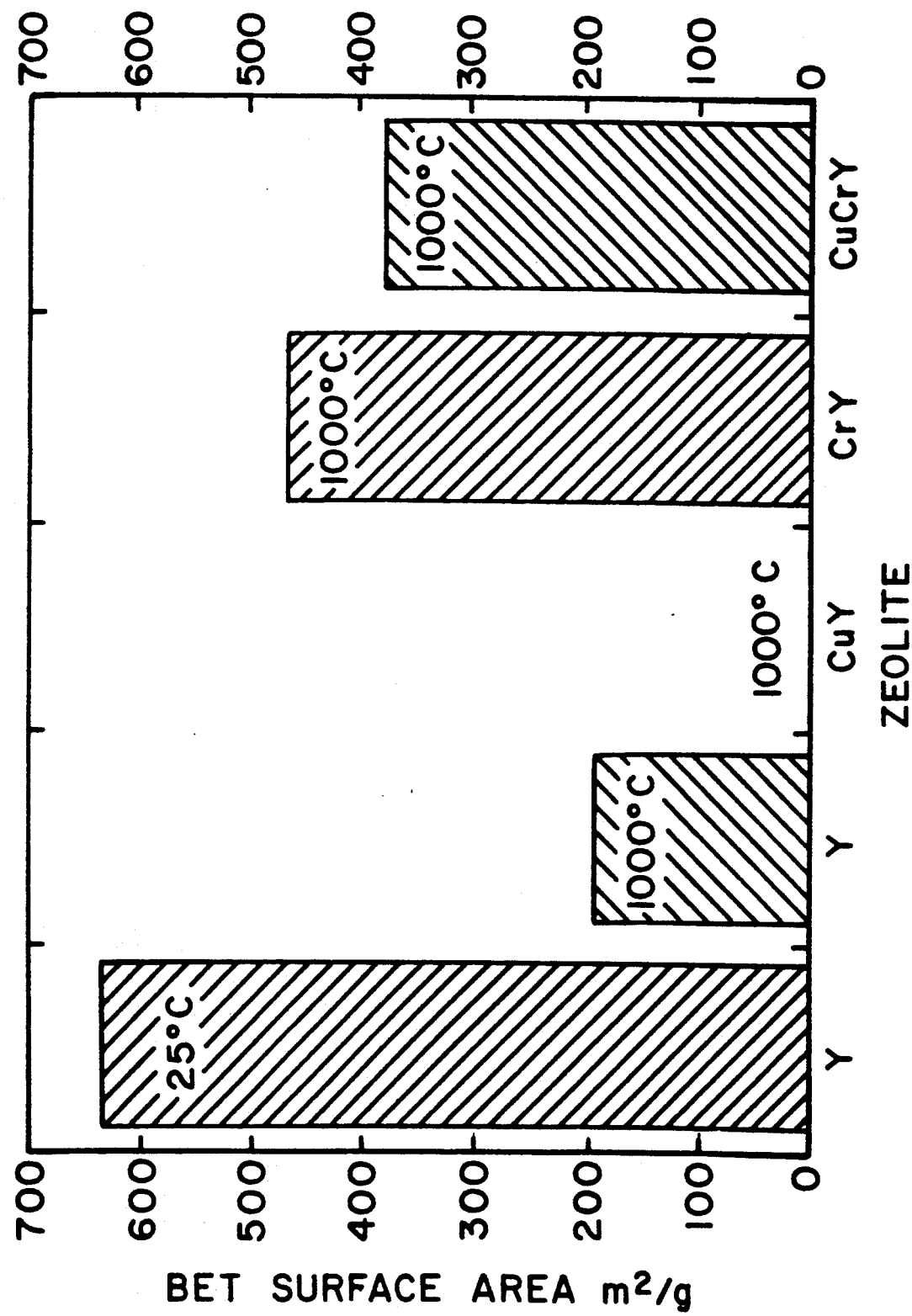

THERMALLY STABLE CHROMIUM-EXCHANGED ZEOLITES AND METHOD OF MAKING SAME

This invention relates to thermally stable Cr-exchanged zeolites and to the method of making them, which involves exchanging chromium into zeolites which have very low alkali metal content. Zeolites which are otherwise thermally unstable, are made thermally stable by exchanging chromium therein.

BACKGROUND OF THE INVENTION

Zeolites are alumino-silicate materials that have significant applications as catalyst or catalyst supports. They have unique properties in this regard because of their crystal structure which consists of various arrangements of $[SiO_4]^{-4}$ and $[AlO_4]^{-5}$ tetrahedra (depending on the zeolite). These arrangements result in zeolitic channels and cages which are, in effect, nano-reactors for catalytic reactions. Consequently, the successful application of zeolites as catalyst or catalyst supports depends on the ability to maintain their novel structure under reaction conditions, and over the life expected of the catalyst in practice.

Although increasingly stable forms of zeolites have been synthesized in recent years, depending on the application of interest, thermal degradation of zeolites is still a significant problem that inhibits their practical use. This problem can be exacerbated in some cases if certain catalytically active metals are supported on or within zeolites. Zeolites with relatively low $SiO_2$ to $Al_2O_3$ ratios find use in applications as catalysts or adsorbents. This is because the "acidity" or the number and strength of the acid sites in zeolites, which actually influences the catalytic and adsorption properties is directly related to the $SiO_2$ to $Al_2O_3$ ratio in the zeolite framework. The lower the $SiO_2$ to $Al_2O_3$ ratio, the higher is the acidity of the zeolite. This is well known in the art. The acid sites in zeolites provide sites for adsorption and catalytic reaction. Therefore, in general, the activity and performance of zeolites as catalysts and/or adsorbents improves with increasing acidity, i.e., with lower $SiO_2$ to $Al_2O_3$ ratios. Unfortunately, as is well known in the art, the thermal stability of the zeolite structure is seriously undermined as the $SiO_2$ to $Al_2O_3$ ratio decreases. This can present significant limitations to the use of zeolites as catalysts/adsorbents in processes that are thermally demanding, such as automotive exhaust treatment, stationary emissions control, etc. As such, there is a significant need for a zeolite that is thermally stable and has the requisite acidity for good catalytic and adsorption activity.

SUMMARY OF THE INVENTION

In accordance with one aspect of the invention, there is provided a thermally stable Cr-zeolite, the thermal stability being characterized by BET surface area upon exposure to temperatures of up to about 1000° C. being at least about 50% of the BET surface area of the zeolite at about room temperature, prior to the exposure to temperatures of up to about 1000° C.

In accordance with another aspect of the invention, there is provided a method of making the above-described thermally stable zeolite, which comprises providing a starting zeolite having an alkali content of less than about about 0.5% by weight based on the oxide, and having a $SiO_2$ to $Al_2O_3$ mole ratio of about 3 to about 200, treating the starting zeolite with $Cr^{+3}$ ions to exchange $Cr^{+3}$ ions into the starting zeolite, and produce a Cr-exchanged zeolite having a level of Cr of greater than about 0.5% by weight, and heat-treating the Cr-exchanged zeolite to produce the thermally stable zeolite.

In accordance with another aspect of the invention, there is provided a Cu-Cr-zeolite having the above described thermal stability characteristics.

In accordance with another aspect of the invention, there is provided a method of making the above described thermally stable Cu-Cr zeolite, which comprises, providing a zeolite having an alkali content of less than about 0.5% by weight based on the oxide, and having a $SiO_2$ to $Al_2O_3$ mole ratio of about 3 to about 200, and copper and chromium ions exchanged therein, and heat-treating the Cu-Cr-exchanged zeolite to produce the thermally stable Cu-Cr zeolite.

BRIEF DESCRIPTION OF THE FIGURES

FIG. 1 is a plot showing the surface area of Y zeolite (H+), of Cr-Y zeolite and of Cu-Cr-Y zeolite after exposure to 1000° C. as compared with the surface area of the Y zeolite which has not been exposed to 1000° C. (25° C.).

DETAILED DESCRIPTION OF THE INVENTION

The invention provides a method for making a zeolite that is otherwise suitable for catalytic and adsorption activity, thermally stable as well by exchanging chromium ions into the zeolite. Chromium ions according to the present invention means $Cr^{+3}$ ions. This invention relates to Cr-exchanged zeolites which have high thermal stability, and to Cu-exchanged zeolite having Cr exchanged therein, the thermal stability of which is increased due to the presence of chromium. Copper ions can be $Cu^{+1}$ and/or $Cu^{+2}$ ions.

The method of preparing the zeolites of the present invention starts with a zeolite having a $SiO_2$ to $Al_2O_3$ mole ratio of about 3 to about 200, more preferably about 3 to about 100, and most preferably about 3 to about 20. (The $SiO_2$ to $Al_2O_3$ mole ratio remains relatively constant through the ion exchange process.)

Some types of zeolites that are especially suited to the practice of the present invention are Y-type, ZSM-5, beta, mordenite, and combinations of these. An especially preferred zeolite is the Y-type. A Y-zeolite can be obtained from a supplier, for example, TSZ-350 or TSZ-360 supplied by Tosoh Corporation and called "Ultra-stable Y-zeolite", or CBV-712 supplied by PQ Corporation.

It is critical to the practice of the present invention that the alkali content of the zeolite before being exchanged with chromium ions, be less than about 0.5% by weight based on the oxide, and preferably no greater than about 0.25%. While not wishing to be bound by theory, it is believed that the exchange with chromium further reduces the alkali. As a result, the purity of the product Cr-exchanged zeolite with respect to alkali is insured in order to meet the high thermal stability requirements of the present invention. The low alkali zeolite can be obtained from a supplier. Or, the alkali content can be reduced by methods known in the art, for example by subjecting a zeolite having an alkali content greater than about 0.5 wt. %, to ion exchange with another cation. It is preferred that the alkali, e.g., sodium-containing zeolite be contacted with a solution having hydrogen and/or ammonium ions as exchangeable cations, ammonium ions being more easily exchanged. Thereafter, the hydrogen and/or ammonium ions are exchanged for the chromium ions. The exchanging can be done by contacting the zeolite with a solution containing hydrogen or ammonium ions at an appropriate temperature, typically from about 50° C. to about 95° C. for an appropriate length of time, typically about 1 to about 24 hours.

The above starting zeolite having the low alkali content is treated with $Cr^{+3}$ ions by any technique known in the art, such as by contacting the it with a solution of $Cr^{+3}$ ions. The zeolite can be contacted more than one time with fresh solution depending on how much Cr is desired to be exchanged therein. The solution can be made by dissolving any soluble chromium salt that yields the ions, and the invention is not limited to the nature of the chromium ion solution. Examples of such salts include, but are not limited to: chromium nitrate, chromium chloride, chromium sulfate, etc. The specific amount of chromium ions that can be exchanged into the zeolite depends on the kind and quantity of other metals that are exchanged into the zeolite and that are desired to remain exchanged therein after the chromium ions are exchanged, and this depends largely on the intended application. It also depends on the $SiO_2$ to $Al_2O_3$ mole ratio of the zeolite which, in turn, determines the exchange capacity of the zeolite for $Cr^{+3}$ or other ions, the capacity increasing as the $SiO_2$ to $Al_2O_3$ mole ratio decreases.

The zeolites can be in any convenient form when treated with the $Cr^{+3}$ ions. For example, they can be in powder form, self-supporting geometric shapes as bead, or pellet, monoliths, e.g., extruded honeycombs, etc, or be in contact with a substrate, preferably a honeycomb substrate.

If the zeolite is in powder form, it can be slurried with the metal salt solution. If the zeolite is in a self supporting shape, the shape can be sprayed with, dipped into, or coated with the metal salt solution.

The resulting Cr-exchanged zeolite is then washed if necessary, usually with deionized water to remove the excess chromium solution from the surfaces of the zeolite.

The Cr-exchanged zeolite can be dried prior to the heat-treating step, at about 100° to about 110° C. in air for about 2 to about 24 hours.

The Cr-exchanged zeolite is heat treated to stabilize it and produce the thermally stable zeolite. Heat treating temperatures are usually about 400° to about 600° C. Heat treating times are typically about 1 to about 24 hours and are carried out typically in air.

The Cr-exchanged zeolites of the present invention are more thermally stable than the corresponding zeolites without the chromium For the purposes of the present invention, the degree of thermal stability is determined by measuring the surface area of the zeolite after exposure to a given temperature. The specific surface area is measured by the known BET technique. A zeolite is considered to be thermally stable, if, upon exposure to temperatures of up to about 1000° C. for about 6 hours, the BET surface area is at least about 50% of the BET surface area of the zeolite at about room temperature, prior to exposure to the high temperature. The thermally stable zeolites of the present invention possess this property.

One preferred technique for carrying out the above described embodiment, although it is to be understood that the invention is not limited to this technique, is as follows. The starting zeolite, e.g., a Y-zeolite in the H+ form is contacted with a solution of chromium nitrate at an elevated temperature, for example at about 50° to about 95° C. for a period of time of about 2 to 4 hours. Proportions of zeolite and chromium can vary depending on how much chromium is desired to be exchanged. However, typically, about 100 ml to about 1000 ml, of a solution of about 0.01 to about 0.5 molar chromium salt solution is mixed with about 10 to about 500 g of the zeolite. The zeolite is then removed from the resulting liquor by techniques such as filtration or decantation, and is then washed a number of times, typically about 2 to 6 times, with hot deionized water to wash away the excess chromium salt solution from the surfaces of the zeolite. In order to increase the Cr loading in the zeolite, the zeolite after separation from the liquor and usually prior to washing, can be recontacted with a fresh chromium salt solution. These steps of contacting (and washing, if desired), can be repeated until a sufficient amount of Cr is exchanged into the zeolite. The washed zeolite is then dried typically at about 100° to about 110° C. in air for about 2 to about 24 hours. The dried zeolite is then heat-treated in air at typically about 400° to about 600° C. for a sufficient time to stabilize the Cr in the zeolite and produce the thermally stable zeolite of the present invention.

The minimum amount of Cr in the zeolite that is required to impart thermal stability is a function of the zeolite $SiO_2$ to $Al_2O_3$ mole ratio, the kind and amounts of other metals present in the zeolite, etc. In general, the more Cr in the zeolite, the greater is the degree of thermal stability imparted to the zeolite. The levels of Cr in the thermally stable zeolite are greater than about 0.5 wt. %, advantageously greater than about 1.0 wt. % and even more advantageously greater than about 2.0 wt. %. The maximum amount of Cr that can be exchanged into the zeolite is limited by the zeolite exchange capacity.

In accordance with another embodiment, a thermally stable zeolite is produced which has both Cu and Cr exchanged therein. The addition of chromium results in an increase in thermal stability over that of the zeolite with only Cu exchanged therein. This Cu-Cr zeolite is made by providing a zeolite, e.g., a Y-zeolite, having the previously described alkali content and $SiO_2$ to $Al_2O_3$ mole ratio, exchanging copper and chromium ions into the zeolite, and then heat-treating as described for the previous embodiment.

Several techniques are especially suited for making this zeolite. The chromium and copper ions can be exchanged sequentially, and in any order: Cu and then Cr, or Cr and then Cu. For example, the zeolite can be contacted in sequence with solutions containing salts of copper or salts of chromium. The amounts of copper and chromium are selected depending on the Cu and Cr content desired. Typically, the zeolites are washed, dried and heat-treated between respective contacts with Cu and Cr. Or the Cu and Cr can be applied simultaneously, for example, by contacting the starting zeolite with a solution containing copper and chromium salts, e.g., nitrates, chlorides, sulfates, etc., in predetermined amounts related to how much of each metal is to be exchanged therein. The Cu-Cr exchanged zeolite is then washed, dried, and heat-treated. The zeolite to be exchanged can be provided in any form initially. For example, the zeolite can be provided in the H+ or $(NH_4)^+$ form, or combinations. It can then be exchanged with Cu and Cr as described above. The zeolite can be provided in totally in either the Cu or Cr form and then partially exchanged with the other.

Typically, in the Cu-Cr exchanged zeolite, the Cu and Cr are in a weight ratio of about 1:1 to about 1:4 Cu:Cr. Anyone skilled in the art can determine the proper amounts of Cu and Cr that are to be contacted with the zeolite depending on the technique employed. Typically the levels of Cu and Cr are about 0.5 to about 4.0 percent by weight Cu and about 0.5% to about 10.0% by weight Cr.

One preferred technique of making the Cu-Cr-exchanged zeolite, although it is to be understood that the invention is not limited to this technique, is to first make the Cu-zeolite, e.g., Cu-Y-zeolite, and then exchange Cr into the Cu-zeolite to obtain Cu-Cr-zeolite, as follows A $H^+$ or $(NH_4)^+$ form Y-zeolite is obtained from a supplier and contacted with a copper salt solution, preferably cupric nitrate at an elevated temperature, for example at about 50° to about 95° C. for a period of time of about 2 to 4 hours. The zeolite is then removed from the resulting liquor and is then washed a number of times, typically about 2 to 6 times, with hot deionized water to remove excess salt solution from the surfaces of the zeolite. If necessary, the zeolite can be recontacted with fresh copper salt solution usually prior to washing, in order to obtain the desired loading of Cu into the zeolite. The zeolite is then recovered from the final wash solution and dried at and heat treated according to the procedure described previously, to stabilize the Cu-zeolite. The Cu-zeolite prepared in this manner is contacted next with a chromium salt solution, preferably chromium nitrate solution, at an elevated temperature, for example about 50° to about 95° C. for a period of time of about 2 to about 4 hours. It is then separated from the resulting liquor, washed, dried and heat-treated in air in a manner described above for preparing the Cu-zeolite. If necessary, the zeolite can be recontacted with fresh Cr salt solution, usually prior to washing, in order to obtain the desired loading of Cr into the zeolite. The above described process yields Cu-Cr zeolite.

Another preferred technique of making the Cu-Cr-zeolite is to contact a solution of chromium and copper salts, e.g., cupric nitrate and chromium nitrate with the zeolite, e.g., Y-zeolite at about 50° C. to about 95° C. for about 2–4 hours. The zeolite is then removed from the resulting liquor and is then washed a number of times, typically about 2 to 6 times, with hot deionized water to remove excess salt solution from the surfaces of the zeolite. If necessary, the zeolite can be recontacted with fresh Cu-Cr salt solution usually prior to washing, in order to obtain the desired metal loadings into the zeolite. The zeolite is then recovered from the final wash solution and dried and heat treated as described previously to stabilize the Cu-Cr zeolite.

The Cr-exchanged zeolites of the present invention are more thermally stable than the corresponding zeolites without the chromium.

Zeolites have very attractive properties as catalysts or hosts for catalyst in many applications. Their thermal stability, however, can be a serious limiting factor for higher temperature and/or long life requirement applications, such as automotive exhaust treatment, stationary emissions control, etc. The Cr-exchanged zeolites of the present invention can find use in applications that are thermally demanding. Having chromium exchanged into the zeolite greatly improves the thermal stability of the zeolites. Therefore, the unique properties of zeolites can be advantageously utilized in applications not possible hitherto In accordance with one preferred embodiment, the Cr-zeolite or Cu-Cr zeolite in the form of a slurry is contacted with a substrate to form a green coating thereon which is then dried and heat-treated. The slurry contains other components such as binders, and dispersing agents, etc, as is known in the art. Some binders are aluminum oxide, most preferred of which is the precursor boehmite, other precursors of aluminum oxide, e.g., aluminum nitrate, and silica, titania, zirconia, rare earth oxides, e.g., ceria, etc, and their precursors.

Some typical compositions are in percent by weight 0 to about 50 methylcellulose, 0 to about 50 silica, silica gel, or silica precursors, 0 to about 50 $Al_2O_3$ from boehmite, aluminum nitrate, or alumina sol, and about 50 to about 95 of the zeolite.

More preferred compositions are in percent by weight 0 to about 5 methylcellulose, 0 to about 30 silica, silica gel, or silica precursors, 0 to about 30 alumina from aluminum nitrate, 0 to about 15 alumina from boehmite, and about 70 to about 90 being the zeolite.

The zeolite can be blended with about 0.5 to about 2.0% methylcellulose (Dow A4M). In each case a slurry is formed in a suitable machine such as a ball mill, mix-muller, or double-arm mixer by admixing with a liquid medium optionally containing about 0.01 to about 1.0% by weight surface active agent such as Airco's Surfanol 485. The liquid medium is added to the solids to obtain about 25 to about 60 wt. % solids content. The preferred liquid medium is water, however organic liquids in combination with water can also be used, for example, isopropyl alcohol+water. Organic liquids by themselves can also be used, e.g., toluene or xylene. Optionally the slurry can have surfactants such as, Surfanol ®.

Application of the slurry to the substrate can be done by any convenient technique such as dipping, or spraying, depending on size and geometry of the substrate, and the invention is not limited to any technique. However, most typically it is done by dipping the substrate in the slurry followed removing the excess slurry by blowing it off. The substrate is then dried to remove the water. The dipping and drying is repeated if necessary until the desired amount of slurry components are applied.

The green coated substrate is heat treated at sufficient temperature for a sufficient time to form the zeolite as a washcoat on the substrate, and to bond the particulates of the washcoat to the substrate and to each other. The heat treating conditions vary with the specific slurry components, size and configuration of the substrate, and other processing conditions. However, in general the heat treating conditions are about 400° C. to about 700° C., and preferably about 500° C. to about 650° C. for about 3 to about 6 hours.

It is to be understood that the invention is not limited to the nature of substrate materials. However, the substrate is most desirably made of any material that is suitable for high temperature applications. Some preferred materials are those that include as a predominant phase: ceramic, glass-ceramic, glass, high surface area-high temperature stable oxides, metal, and combinations thereof. By combinations is meant physical or chemical combinations, e.g., mixtures or composites. Some substrate materials that are especially suited to the practice of the present invention, although it is to be understood that the invention is not limited to these, are those made of cordierite, mullite, clay, talc, zircon, zirconia, spinel, alumina, silica, lithium aluminosilicates, alumina silica, feldspar, titania, fused silica, nitrides, carbides, borides, e.g., silicon carbide, silicon nitride or mixtures of these. Some typical ceramic substrates are disclosed in U.S. Pat. Nos. 4,127,691 and 3,885,977. Those patents are herein incorporated by reference as filed. Some preferred metal substrates are stainless steels and iron group metal based bodies, (Fe, Co, Ni) such as, for example, Fe and Cr and/or Al bodies with optional additions of various metals and/or oxides for various properties and applications. Some typical metal or metal alloy bodies are disclosed in U.S. Pat. Nos. 4,758,272 and 4,992,233 and EPO patent application publication no. 488716A1, published Mar. 6, 1992. Those patents and application are herein incorporated by reference as filed. Electrically heated porous or non-porous substrates are also suitable.

The substrates can be of any size and shape suitable to the application. Preferred substrates are honeycomb structures made typically by extrusion.

Some examples of honeycombs produced by the process of the present invention, although it is to be understood that the invention is not limited to these, are those having about 94 cells/cm$^2$ (about 600 cells/in$^2$), about 62 cells/cm$^2$ (about 400 cells/in$^2$), or about 47 cells/cm$^2$ (about 300 cells/in$^2$), those having about 31 cells/cm$^2$ (about 200 cells/in$^2$), or those having about 15 cells/cm$^2$ (about 100 cells/in$^2$). These bodies are made preferably of, but not limited to, materials which when fired form cordierite. Typical wall thicknesses in catalytic converter applications, for example, are about about 0.15 mm (about 0.006") for 400 cells/in$^2$ (62 cells/cm$^2$) honeycombs. Wall thicknesses range typically from about 0.1 to about 0.6 mm, (about 0.004" to about 0.025"). The external size and shape of the body is controlled by the application, e.g. engine size and space available for mounting in an automotive exhaust treatment application.

The substrate can have any degree of porosity from low to high. For example, typically the wall porosity ranges from about 0% by volume to higher values which are determined by practical limits depending on the composition of the substrate and the intended application. For example, in metal monoliths, the open porosity is typically about 1 to about 2% by volume, although it can be as high as about 40%. For ceramic monoliths, the open porosity is typically about 25% to about 50% by volume.

To more fully illustrate the invention, the following non-limiting examples are presented. All parts, portions, and percentages are on a weight basis unless otherwise stated.

Inventive Example 1

The starting zeolite is Y-zeolite supplied by Tosoh Corporation designated as TSZ-350HUA. This zeolite has a SiO$_2$ to Al$_2$O$_3$ mole ratio of about 9.2. The zeolite is in the H$^+$ form. About 50 g of this starting zeolite are added with agitation to about 200 ml of a solution of water soluble chromium salt, such as chromium nitrate (Cr(NO$_3$)$_3$). The strength of the solution is about 0.1M in Cr. The mixture is placed in a reflux reactor equipped with a reflux condenser, and refluxed for about 2–4 hours at about 90° C. with agitation. At the end of this time, the zeolite-solution mixture is hot filtered or centrifuged about 5 times (for example, at about 10,000 rpm for about 5 minutes) to wash the resulting Cr-exchanged zeolite thoroughly. This insures that there is little or no chromium salt left on the external surface of the zeolite. Following this, the zeolite is filtered to separate the solids from the liquid, and the zeolite is dried at about 100°-110° C. in air for at least about 8 hours. Subsequently the dried zeolite is calcined in air at about 400° C. for about 12 hours. FIG. 1 shows the surface area of Y zeolites at room temperature and after exposure to 1000° C. for about 6 hours. FIG. 1 shows that at room temperature the starting zeolite has a BET surface area of greater than about 600 m$^2$/g. Upon heat treatment at about 1000° C. for about 6 hours, it suffers significant loss in surface area, resulting in a surface area of less than about 200 m$^2$/g. On the other hand, chromium-exchanging this zeolite permits a significantly higher part of the original surface area (and therefore adsorption capacity and/or catalytic activity) to be retained. FIG. 1 shows, therefore, that the Cr-exchanged Y-zeolite is more thermally stable than that zeolite without the chromium.

Invention Example 2

This is an example of making a catalytically active but thermally unstable zeolite (CuY) more thermally stable by modifying it with chromium according to the present invention to derive a practically feasible catalyst (CuCrY).

About 120 g of cupric nitrate and about 40 g of chromium nitrate are dissolved in about 200 ml of water with agitation. About 50 g of Y-zeolite (TSZ-350HUA) are added with agitation. The resulting mixture is refluxed in a reflux reactor for about 4 hours at about 80°-95° C. The zeolite is then washed by centrifuging it about 5 times at about 10,000 rpm. It is then filtered and dried at about 100° C. overnight. It is then heat-treated at about 400° C. for about 12 hours to stabilize the zeolite. The resulting Cu-Cr-Y-zeolite has both Cu and Cr exchanged therein, about 0.61 wt. % Cu, and about 1.47 wt. % Cr. FIG. 1 shows the behavior of this Cu-exchanged zeolite. Copper-exchanged zeolites have significant applications or potential in various emissions control processes. However, the problem with Cu-Y zeolite is clearly evident in FIG. 1. At about 1000° C., this zeolite has completely collapsed (almost no surface area), indicating that copper seriously degrades the thermal stability of the zeolite. However, when such a zeolite is modified with chromium, as shown in FIG. 1, (CuCrY), its thermal stability is greatly improved (about 370 m2/g).

It should be understood that while the present invention has been described in detail with respect to certain illustrative embodiments thereof, it should not be considered limited to such but may be used in other ways withoud departing from the spirit of the invention and the scope of the appended claims.

What is claimed is:

1. A method of making a thermally stable Cu-Cr zeolite, said method comprising:
   a) providing a Y zeolite having an alkali content of less than about 0.5% by weight based on the oxide, and having a SiO$_2$ to Al$_2$O$_3$ mole ratio of about 3 to about 200, and copper and chromium ions exchanged therein, wherein said alkali content is provided at least before the Cr ions are exchanged therein, the weight ratio of Cu:Cr being about 1:1 to about 1:4; and b) heat-treating said Cu-Cr-exchanged zeolite to produce said thermally stable Cu-Cr zeolite, wherein the BET surface area of said thermally stable zeolite upon exposure to temperatures of up to about 1000° C. is at least about 50% of the BET surface area of said starting zeolite at about room temperature, prior to said exposure to temperatures of up to about 1000° C.

2. A method of claim 1 wherein said alkali content is no greater than about 0.25% by weight.

3. A method of claim 4 wherein said $SiO_2$ to $Al_2O_3$ mole ratio is about 3 to about 100.

4. A method of claim 3 wherein said ratio is about 3 to about 20.

5. A method of claim 1 comprising the additional step of applying said thermally stable Cu-Cr-zeolite to a substrate.

6. A Cu-Cr-exchanged zeolite produced by the method of claim 1.

7. A method of claim 1 wherein the copper and chromium ions are provided exchanged therein by first contacting the zeolite with a solution of copper ions to provide a copper exchanged zeolite, and thereafter contacting the copper exchanged zeolite with a solution of chromium ions, wherein the amounts of copper ions and chromium ions in said solutions are sufficient to result in both copper and chromium ions being exchanged into the zeolite.

8. A method of claim 1 wherein the copper and chromium ions are provided exchanged therein by first contacting the zeolite with a solution of chromium ions to provide a chromium exchanged zeolite, and thereafter contacting the chromium exchanged zeolite with a solution of copper ions, wherein the amounts of copper ions and chromium ions in said solution are sufficient to result in both copper and chrommium ions being exchanged into the zeolite.

9. A method of claim 1 wherein the copper and chromium ions are provided exchanged therein by contacting the zeolite with a solution of both chromium ions and copper ions, the amounts of copper ions and chromium ions in said solution being sufficient to result in both copper and chrommium ions being exchanged into the zeolite.

* * * * *